(12) United States Patent
Brunheroto et al.

(10) Patent No.: US 6,690,683 B1
(45) Date of Patent: Feb. 10, 2004

(54) METHOD AND APPARATUS FOR DEMULTIPLEXING A SHARED DATA CHANNEL INTO A MULTITUDE OF SEPARATE DATA STREAMS, RESTORING THE ORIGINAL CBR

(75) Inventors: Jose R. Brunheroto, Hawthorne, NY (US); Frans Laemen, Ossining, NY (US); Julio Nogima, White Plains, NY (US); Frank A. Schaffa, Hartsdale, NY (US); William J. Anzick, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,333

(22) Filed: Nov. 23, 1999

(51) Int. Cl.[7] .................................................. H04J 3/02
(52) U.S. Cl. ....................................... 370/542; 370/508
(58) Field of Search ................................. 370/542, 543, 370/544, 535–538, 503–508, 509, 510, 516, 517, 280, 321, 337, 347, 352, 366, 394, 395.1, 395.4, 395.52, 395.64, 400, 401, 412, 413, 442, 465, 470, 498; 375/240.27, 240.28

(56) References Cited

U.S. PATENT DOCUMENTS

| | | | | |
|---|---|---|---|---|
| 5,517,250 A | | 5/1996 | Hoogenboom et al. | 375/240.27 |
| 5,557,538 A | | 9/1996 | Retter et al. | 375/240.15 |
| 5,619,337 A | | 4/1997 | Naimpally | 386/83 |
| 5,684,804 A | * | 11/1997 | Baronetti et al. | 370/509 |
| 5,818,539 A | | 10/1998 | Naimpally et al. | 348/512 |
| 6,034,974 A | * | 3/2000 | Matsuoka et al. | 370/542 |
| 6,259,693 B1 | * | 7/2001 | Ganmukhi et al. | 370/366 |
| 6,359,911 B1 | * | 3/2002 | Movshovich et al. | 370/536 |
| 6,434,170 B1 | * | 8/2002 | Movshovich et al. | 370/536 |

* cited by examiner

Primary Examiner—Douglas Olms
Assistant Examiner—Brian Nguyen
(74) Attorney, Agent, or Firm—Scully, Scott, Murphy & Presser; Douglas W. Cameron, Esq.

(57) ABSTRACT

A system and method for demultiplexing a TDM channel by redirecting all transport packets communicated on said channel as containing one of a multitude of possible PIDs, while recreating the CBR of the original transport packet transmission by restoring all discarded IDLE packets to enable time delayed re-transmission utilizing a generic TDM function.

31 Claims, 7 Drawing Sheets

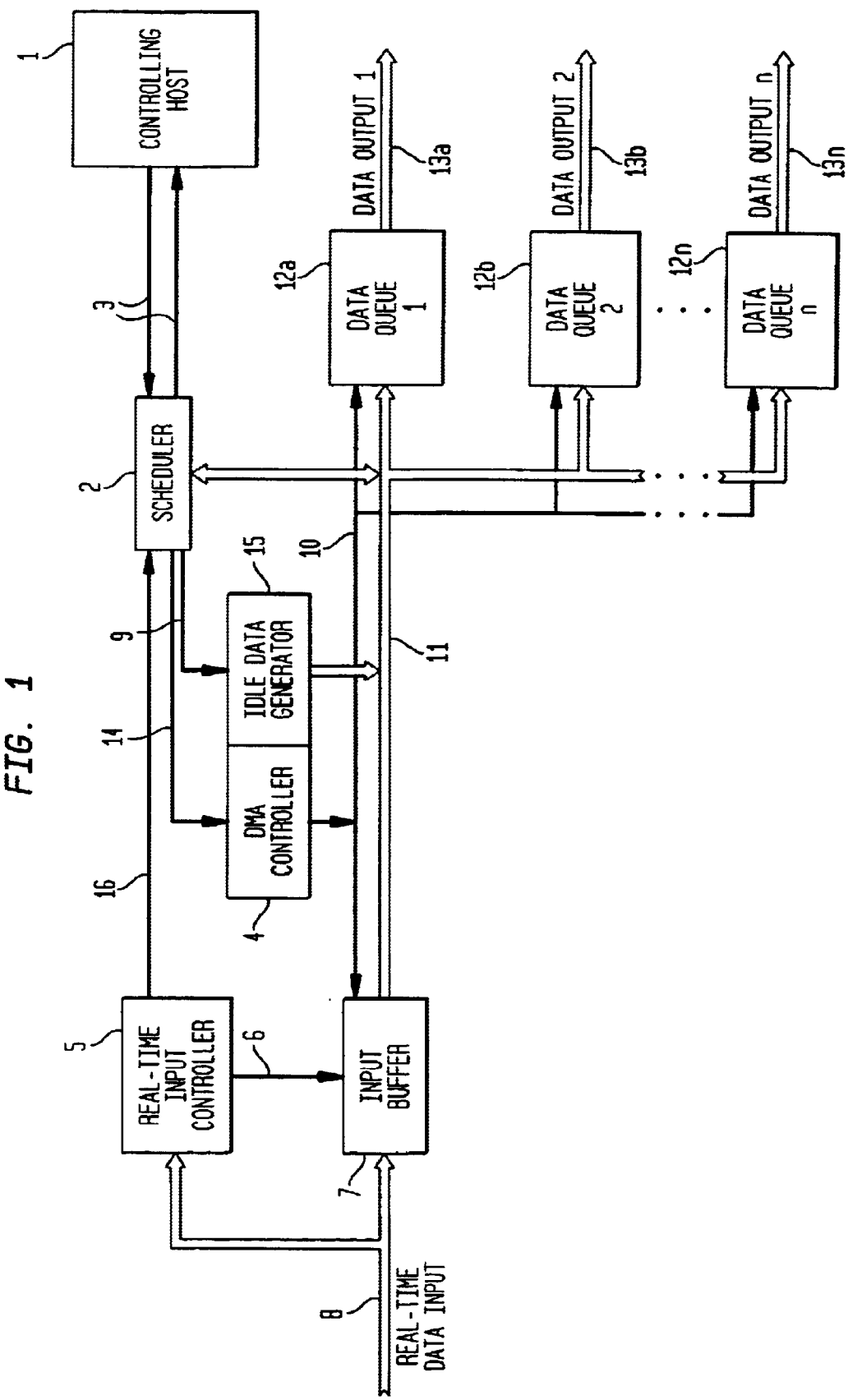

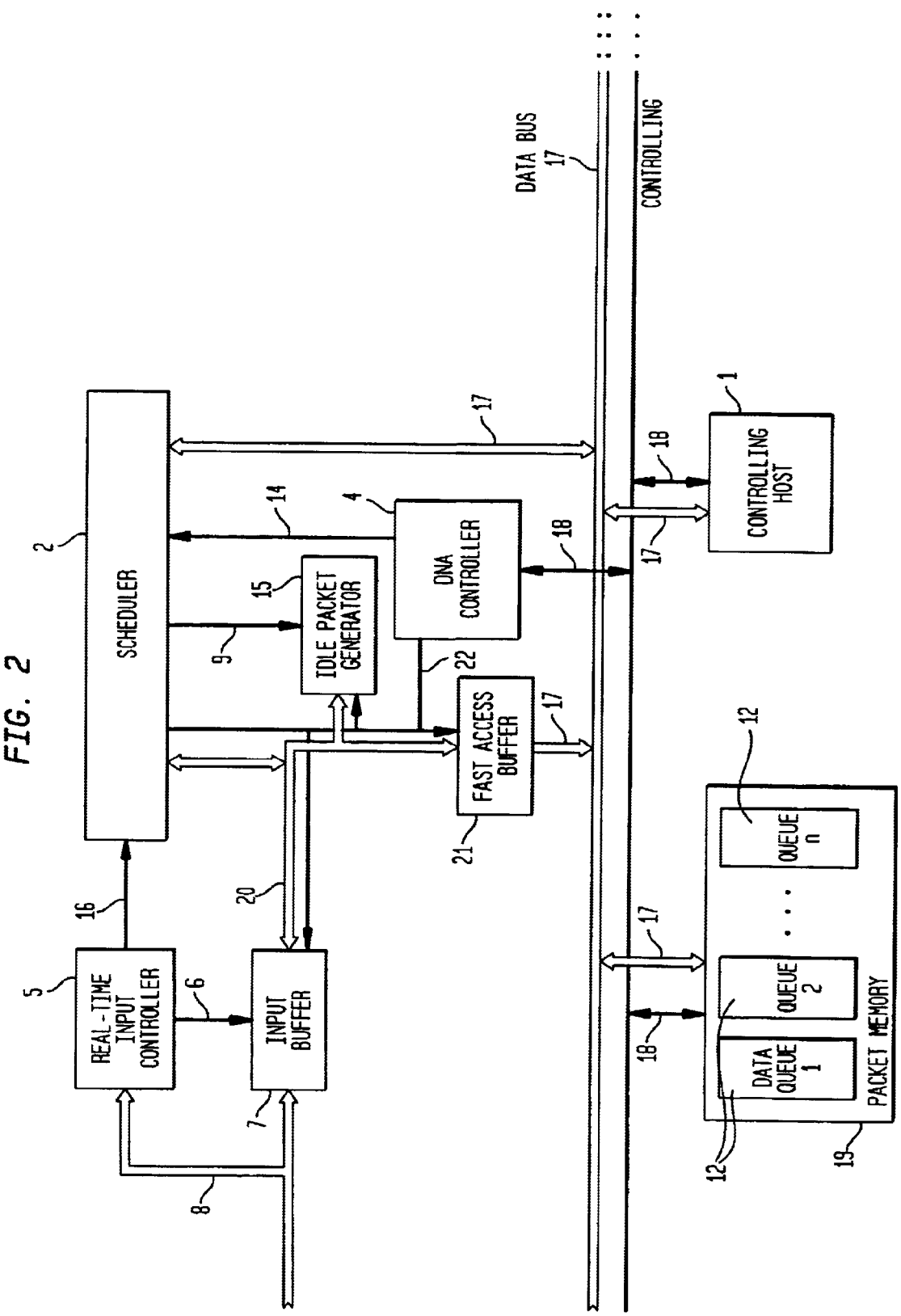

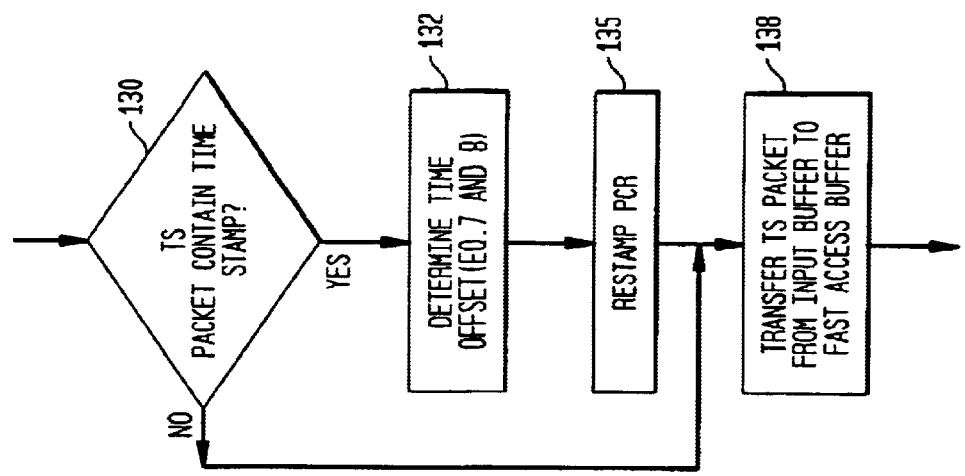
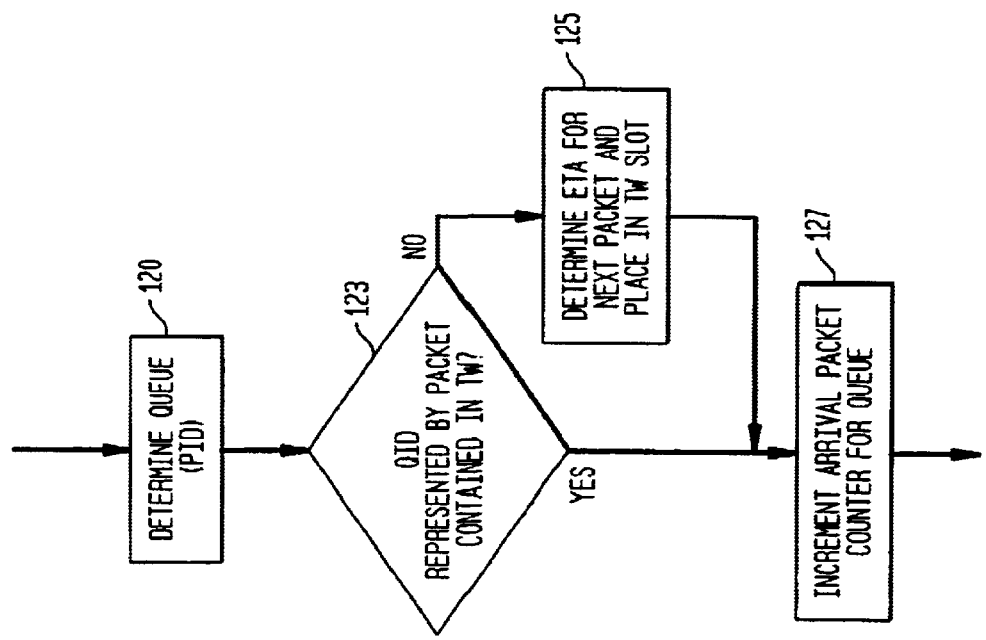
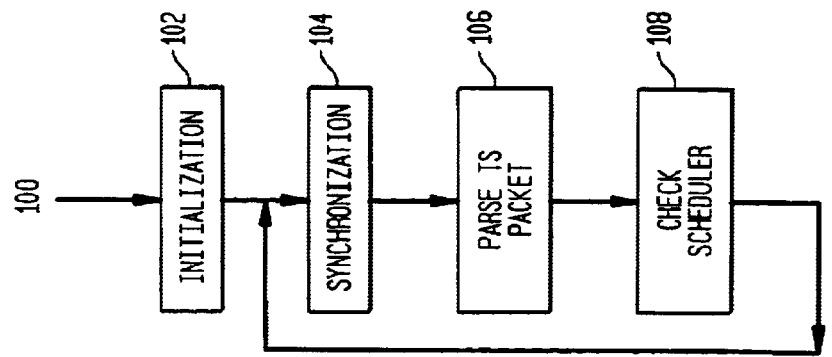

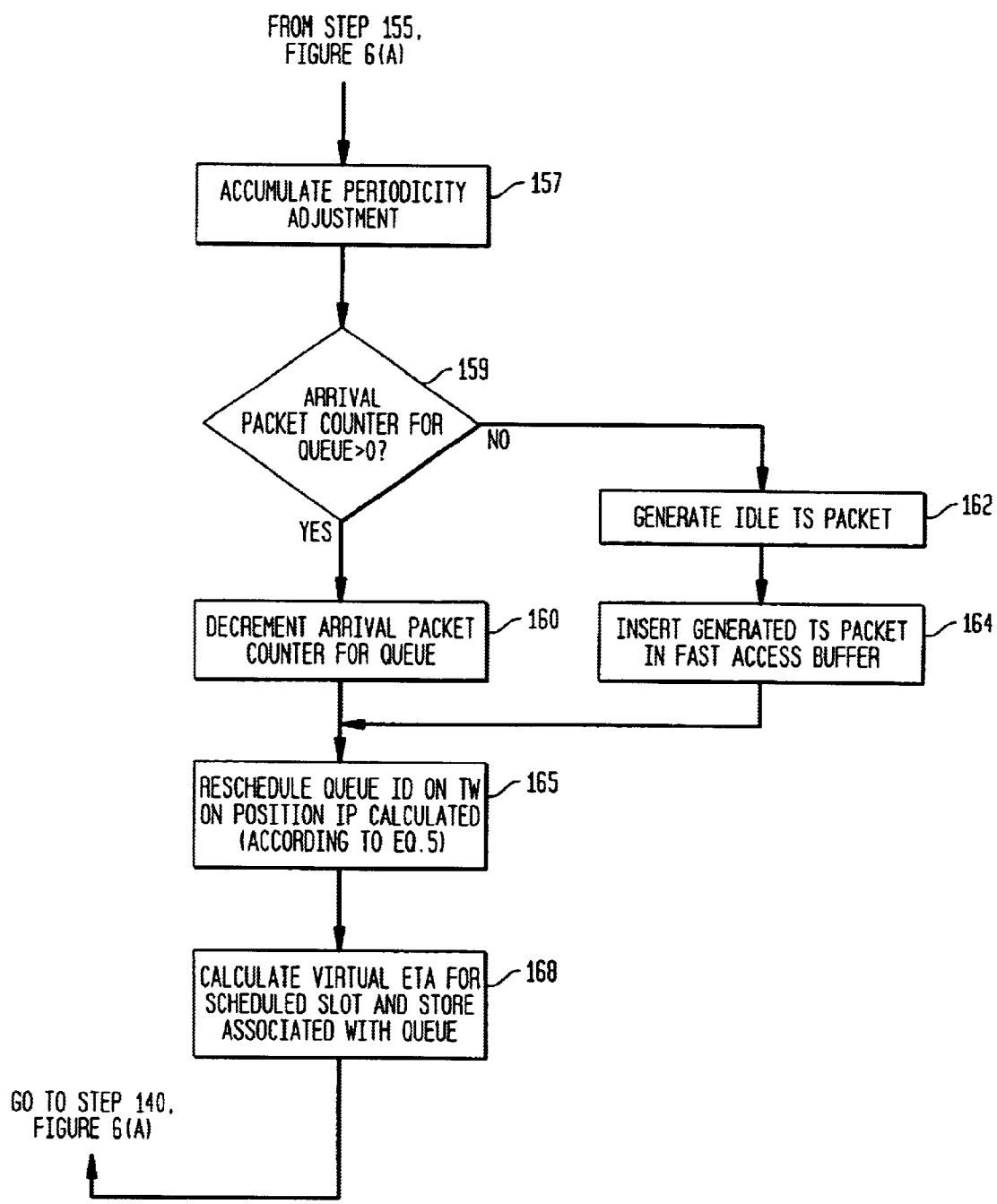

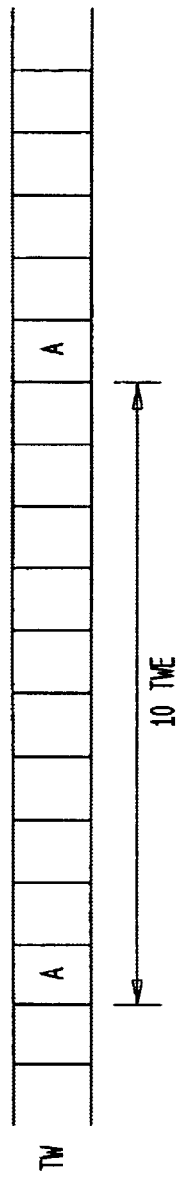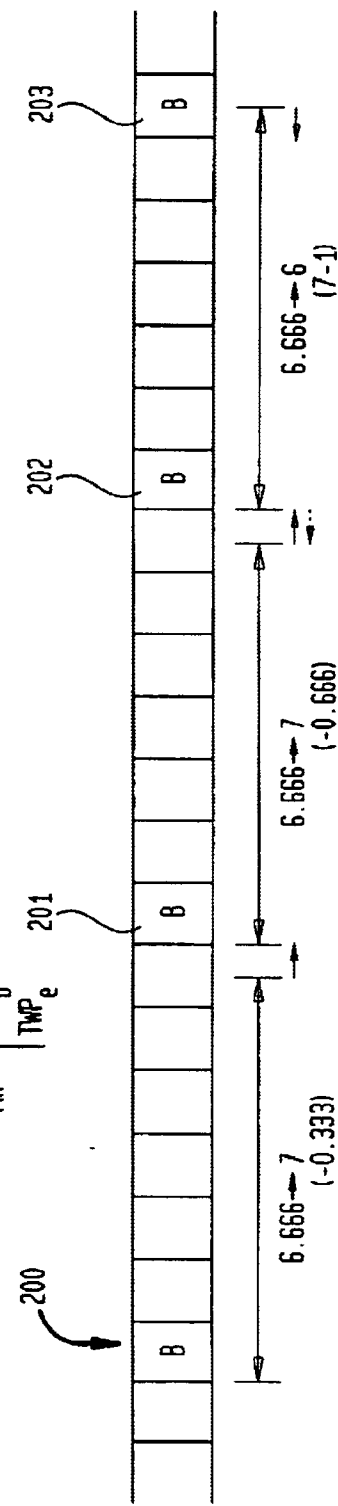

METHOD AND APPARATUS FOR DEMULTIPLEXING A SHARED DATA CHANNEL INTO A MULTITUDE OF SEPARATE DATA STREAMS, RESTORING THE ORIGINAL CBR

BACKGROUND OF THE INVENTION

1. Field of the Invention

The present invention relates generally to systems and methods for demultiplexing Time Division Multiplexed (TDM) data streams comprising MPEG encoded data, and particularly, to a system and method for de-multiplexing Constant Bit Rate (CBR) encoded multimedia content transmitted over a channel utilizing fixed packet size TDM.

2. Discussion of the Prior Art

The process of preparing content for (Constant Bit Rate) "CBR" transmission is closely related to the encoding mechanism utilized. The CBR process forces the encoder to produce an output bit rate lower than or equal to the target bit rate, after which sufficient IDLE data is added to any output featuring a bit rate less than required in order to achieve CBR. When multiplexing multiple CBR sources into a shared channel utilizing TDM, the TDM channel is filled with IDLE data filling up to capacity depending upon the transmission protocol. Physical layers such as, DVB-SPI (digital video broadcast) deployed in system protocols such as MPEG-II Transport Stream defined in the ISO/IEC 13818 standard, leave IDLE data generated by the TDM mechanism and IDLE data present in the CBR encoded content indistinguishable. Generally, IDLE data generated by either of the two mechanisms is immediately discarded upon reception by the receiver, as is the case with de-multiplexers implemented along with MPEG-II decoders, as the sole reason for the presence of such IDLE data is to delay the transmission of upcoming data for decoder buffer management. However, when in place of the expected decoder or end station, an intermediate station is the aimed receiver, which use among others may be to alter the content or simply delay the transmission after which this intermediate station has the task to re-transmit the original CBR content. Thus, the need to recover the original CBR stream including all IDLE data contained in the original CBR content arises.

Systems generally performing a demultiplex function on a received TDM channel are well known in the art. Many of these, such as U.S. Pat. No. 5,517,250, were designed to enable decoders to recover specific types of data, indicated by a unique Packet Identifier (PID) in the transport packet. While removing the Transport Packet layer, elementary video and audio data is distributed to the designated decoders. U.S. Pat. Nos. 5,557,538, 5,684,804, and 5,818,539, describe decoders and intermediate systems utilizing the channel demultiplexing systems. The demultiplexing system functions to redirect incoming data packets based upon the PIDs by associating one PID per destination.

One system, such as described in U.S. Pat. No. 5,619,337, performs a demultiplex function on a received TDM channel and is designed to store one complete Data Stream. However, this system requires a means for storing the actual arrival time per packet, necessitating the presence of a specialized re-transmission mechanism to recreate the Data Stream based upon the stored timing information, rather than a generic multiplex method.

What is needed is a demultiplex function for a TDM channel, capable of redirecting all Transport Packets associated with one datastream which may include a multitude of possible PIDs, while recreating the CBR of the original transmission by recreating all discarded IDLE packets to enable time delayed re-transmission utilizing a generic CBR TDM function.

It would thus be highly desirable to provide a demultiplex system that enables the association of the PID with the original data stream for enabling a multitude of PIDs to be directed towards one destination and, further that is designed to recreate the original CBR Data Stream by regenerating all transmitted packets, including IDLE packets discarded by the demultiplex function.

Moreover, it would be highly desirable to provide a demultiplex system designed to recreate the original CBR data stream by regenerating all transmitted packets, for creating a stored data stream suitable for re-transmission utilizing any generic CBR multiplex function.

SUMMARY OF THE INVENTION

An object of the present invention is to provide a TDM channel demultiplexing system and method that enables the association of the PID with the original data stream for enabling a multitude of PIDs to be directed towards one destination and, further that is designed to recreate original CBR Data Streams by regenerating all transmitted packets, including IDLE packets discarded by the demultiplex function.

Another object of the present invention is to provide a TDM channel demultiplexing system and method that is designed to recreate the original Data Stream by regenerating all transmitted packets, for creating a stored data stream suitable for re-transmission utilizing any generic multiplex function.

According to a preferred embodiment of the invention, there is provided a system and method for de-multiplexing Constant Bit Rate (CBR) encoded content transmitted over a single channel, where the content includes fixed size packets associated with one or more sources transmitting streams at an associated CBR. The method including: a) receiving a packet from the transport stream for placement in a temporary storage buffer; b) identifying each packet arriving from a source, the packet including an optional associated timestamp information indicating actual time of arrival of the packet; c) determining a time offset indicating a difference between actual time of arrival of the packet and an estimated time of arrival for the packet according to the CBR associated with the packet stream providing the identified packet; d) adjusting the timestamp information of the packet with the determined time offset to reflect proper sequence of packet; and, e) storing the packet having the adjusted timestamp information in a demultiplex queue associated with that packet stream, whereby the demultiplex queue includes packets having timestamp information enabling subsequent generation of a corresponding transport stream at the CBR. The system and method includes a mechanism for restoring IDLE data packets that have been discarded upon reception by the receiver.

BRIEF DESCRIPTION OF THE DRAWINGS

Further features, aspects and advantages of the apparatus and methods of the present invention will become better understood with regard to the following description, appended claims, and accompanying drawings where:

FIG. 1 is a diagram illustrating the flow and control for the TDM demultiplexing system of the invention.

FIG. 2 is a functional block diagram depicting the preferred implementation of the system of FIG. 1;

FIG. 4 is a flow chart depicting the general sequence of steps implemented by the demultiplex system of the invention.

FIGS. 5(a) and 5(b) depict a flow chart illustrating the parsing of a transport packet performed by the de-multiplex system of the invention.

FIGS. 6(a) and 6(b) depict a flow chart illustrating the scheduling operation performed by the de-multiplex system of the invention.

FIGS. 7(a) and 7(b) depict respective example transport stream timewheels from a first source (FIG. 7(a)) that yields a time wheel periodicity of a whole number TWI, and a second source (FIG. 7(b)) that yields a fractional time wheel periodicity requiring periodicity offset accumulation.

DETAILED DESCRIPTION OF THE PREFERRED EMBODIMENT

Figure 3A:
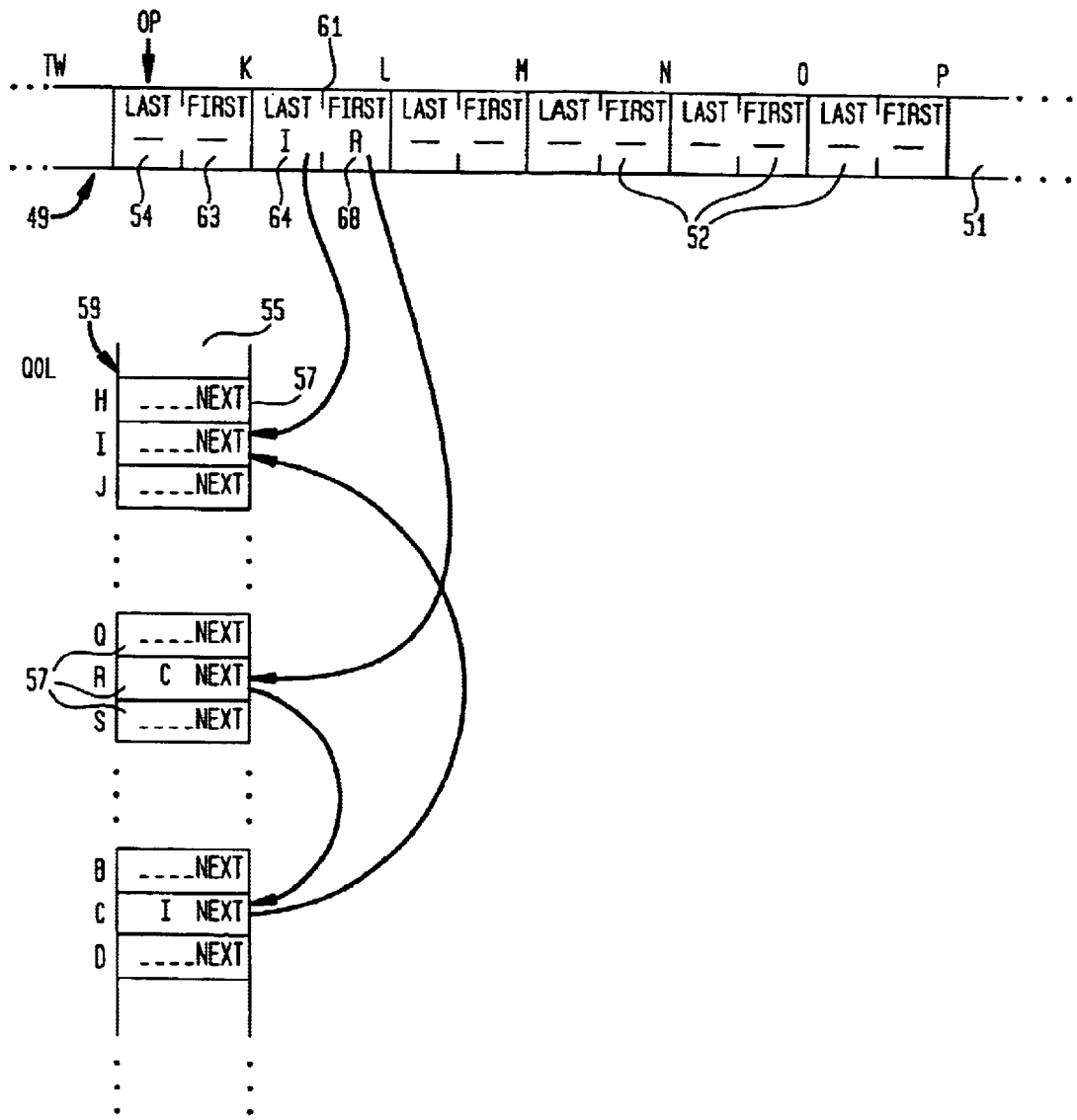
FIGS. 3(a) and 3(b) are diagrams illustrating the time wheel (TW) and queue overflow list (QOL) timing mechanisms implemented by the scheduler device.

As shown in FIGS. 1 and 2, there is illustrated the following components of the TDM demultiplexing system of the invention: an input, real-time data channel (8) for receiving transport packets present in a TDM data stream; an input buffer (7) for receiving arriving transport packets; a packet memory (19) including one or more data queue devices (12a, ..., 12n); a real-time input controller device (5) for synchronizing with the incoming Data Stream to ensure the existence of at least one complete accumulated packet in the Input Buffer (7) using control bus (6); a Scheduler device (2) which, in the embodiment described below, comprises a 16-bit embedded controller, in communication with real-time input controller device (5) using the control bus (16) for controlling the demultiplexing function of data queue devices 12a, ..., 12n from the input data channel (8); a shared data bus (17, 18) having unidirectional data flows and which configuration may easily be converted into two separate data busses, a read access bus (13a, ..., 13n) and a write access bus (11) without changing the functionality; and, a controlling host processor (1) for directing the subsequent forwarding of data from the packet memory (19); the input buffer (7) and data queue (12a, ..., 12n) operation are controlled by the DMA controller (4) using control bus (10), additionally, the Scheduler device (2) configures the DMA controller (4) using the control bus (14). The controlling host processor (1) communicates with the scheduler device (2) using the control bus (3). It is understood that as de-multiplexer to the individual stream, all real-time devices in the system may be implemented in either hardware or software depending upon the maximum supported data rate of the transmission channel.

In accordance with the invention, all transport packets communicated over the TDM data stream share the same Fixed Packet Size referred to as "FPS". For instance, the Fixed Packet Size for a MPEG-2 Transport Stream standard as defined in ISO/IEC 13818 is 188 bytes. According to the invention, the transport packets present in the arriving TDM data channel (8) contain a Packet Identifier referred to as PID. All Transport Packets sharing one common PID contain data originating from a common data source (not shown), indicating a separate data type generated by the common data source. The combined transport packets originating from one common data source resembles a data stream. For each data stream, a list of PIDs is generated, with each PID unambiguously identifying the data stream correlating to the transport packet containing the PID. Every data stream present in the received TDM channel requiring demultiplexing additionally acquires a dynamically assigned unique Queue Identifier referred to herein as a QID. Every assigned QID refers to a Data Queue (12a, ..., 12n) residing in the Packet Memory (19) as shown in FIG. 2, from which the Controlling Host (1) directs further data forwarding.

As now described in greater detail, the Scheduler (2) performing the demultiplex function is capable of demultiplexing any number of QIDs and, therefore, Data Queues (12a, ..., 12n) from the Input Channel (8). The number of supported QIDs is only limited by the size of the Scheduler (2) memory. The supported bandwidth of the Packet Memory (19) shall be sufficient to support at least twice the maximum expected ChbR including overhead, to support both reading from and writing to the separate Data Queues (12). The required Data Queue (12) size depends upon the CBR of the associated Data Stream and the burstness of the removal from that specific Data Queue (12), therefore, all Data Queues (12a, ..., 12n) may have different Data Queue (12a, ..., 12n) sizes. The size of the Packet Memory (19) depends upon the maximum expected number of initialized Data Streams at any given time, the maximum Data Queue (12a, ..., 12n) size, and the maximum expected input Channel Bit Rate (ChbR). Also connected to the Shared Data Bus (17, 18), and through a local connection (20, 22) to the Input Buffer (7), is a real-time DMA Controller (4) and a small Fast Access Buffer (21) large enough to hold at least one transport packet.

In operation, transport packets arrive in the Input Buffer (7) at the ChbR. Upon arrival of every complete Transport Packet, the Scheduler (2) is notified, synchronizing the Scheduler (2) with the Input ChbR through the Real-Time Input Controller (5). With Transport Packet size and ChbR being constant, the Scheduler (2) is capable of maintaining accurate timing information based upon this arrival notification and the packet time tick referred to as Time Wheel Interval (TWI) derived from equation (1a) as follows:

$$TWI = \frac{FPS[bits]}{ChBR[bits/s]} \tag{1a}$$

As will be described in greater detail herein, the Scheduler (2) in each time wheel interval, derives the PID from the transport packet and retrieves the associated QID by means of a lookup table (not shown). If the PID either indicates an IDLE packet or the lookup table entry does no indicate a data source known to the scheduler (2), the transport packet present in the input buffer (7) is discarded. If the PID, through the associated QID, indicates a valid Data Queue (12), the scheduler (2) indicates the arrival of a Transport Packet by incrementing a Packet Counter (PC) (not shown) associated with the indicated QID. The Scheduler (2) transfers the Transport Packet to the Fast Access Buffer (21) and initiates the DMA Controller (4) to perform the actual packet transfer to the associated Data Queue (12). Note that the only functionality of the DMA Controller (4) and Fast Access Buffer (21) combination is to ensure real-time write access to the next scheduled packet, however other hardware configurations are possible to enable concurrent read/write access.

The CBR Recovery function performed by the Scheduler (2) is constructed using two main data structures configured as arrays. As depicted in FIG. 3(a), one data structure (49) is referred to as Time Wheel (TW) array (TWO-51) with Time Wheel Size (TWS) and, a second data structure (59) is referred to as the QID Overflow List (QOL) array (55) with QOL size (QOLS). The size TWS of the TW depends upon the supported periodicity range of the QIDs. For example, higher packet intervals representing lower bit rates require larger TWS values. The QOL array (59) contains one entry (57) per QID and, therefore, the size of QOLS grows linearly with the maximum number of supported QIDs. The TW function represents a spinning wheel or never ending loop, i.e., when the end of the TW array is reached, the first item of the TW array is scheduled next. The current position of the TW is contained in an Output Point (OP), advancing every TWI. As further depicted in FIG. 3(a), every TW entry (52), e.g., TW slot labeled "k" in FIG. 3(a), contains two pointer fields, a field labeled FIRST (63) and a field labeled LAST (54), with each pointer field containing either a NULL value if unused, or a valid QID value pointing into the QOL array (59). Thus, a linked QID list through the QOL is created.

Figure 3B:
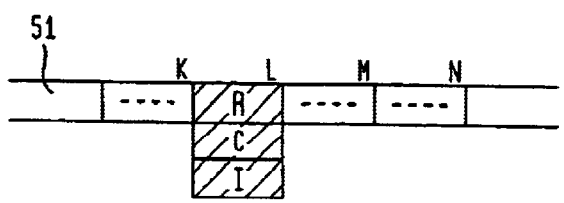

For example, as shown in FIG. 3(a), the FIRST TW entry (68) of a TW interval entry (slot) (61) is pointing to the QOL labelled "R", and the LAST TW entry (64) of a TW interval entry (61) is pointing to the QOL labelled "I". Each of the QOL entries (57) in QOL array (59) each have a single pointer field, labeled NEXT, which contain a value similar to the TW pointer fields, either NULL if unused, or a valid QID value pointing into another QOL entry. For instance, as shown in FIG. 3(a), the QOL array field "R" includes a pointer to a next QOL entry field "C" which, in turn, points to a next QOL entry field "I". This enables a TW slot to comprise a variable length unidirectional linked list of QIDs, which "head" and "tail" are indicated by the two pointers contained in the TWE pointing into the QOL. As depicted in the example of FIG. 3(b), a linked list comprising QOL field "R", "C" and "I", in that order, will be processed, preferably within a time duration corresponding to one TWI. It is understood that the entire list may be handled in one TWI. The Scheduler (2) advances the TW once per TWI driven by a signal derived from the Real-Time Input Controller (5). The TWI value calculated in 27MHz clock ticks is expressed according to equation (1b) as follows:

$$TWI27M = \frac{FPS[bits] \cdot (27E+6)[27\ Mticks/s]}{ChBR[bits/s]} \quad (1b)$$

and stored in two separate fields, a base field TWIb and an extension field TWIe, similar to the MPEG-II PCR syntax as described in the ISO/IEC 12818-1 of the MPEG-II Systems standard. The base part TWIb is calculated according to equation (2a), while the extension part TWIe is calculated according to equation (2b) as follows:

$$TWIb=TWI27M\ \text{DIV}\ 300 \quad (2a)$$

$$TWIe=(TWI27M\ \text{DIV}\ 1)\cdot 64 \quad (2b)$$

In order to achieve the required accuracy using a 16-bit micro-controller, for example, all values such as TWIe containing. values between zero and 300 are multiplied by 64 to make use of the full 16-bit scale of 0 to 65536. Skilled artisans may devise other schemes for conforming to the MPEG-II PCR syntax standard according to a particular hardware implementation.

Initially, all QIDs, TW and QOL entries are empty and the OP contains an arbitrary value between its minimum and maximum range. Since the TW wraps around, this "initial" point for OP is at any arbitrary point within its range. Initial values are calculated and the scheduling process is started. Whenever the scheduling and demultiplexing process takes more than the maximum TWI time, the Input Buffer (7) provides additional buffering allowing the Real-Time Input Controller (5) to continue without data loss. The scheduling mechanism recovers this time by performing several consecutive scheduling activities with processing times below the TWI time, averaging below the TWI time. Every QID requiring CBR recovery is registered in the Scheduler (2) and an accurate periodicity value TWPa expressed in TWE (time wheel entries) is generated according to equation (3) as follows:

$$TWPa = \frac{ChBR[bits/s]}{CBR[bits/s]} \quad (3)$$

The whole number of TWE of TWPa is expressed in TWP according to equation (4a) as follows:

$$TWP=ChBR\ \text{DIV}\ CBR \quad (4a)$$

It is understood that opportunistic data inserted into the data stream does not require CBR recovery and consequently, is not scheduled.

FIG. 7(a) illustrates an example of a transport stream from Source A, a 4 Mbit/sec source transmitted on a 40 Mb/sec transport channel, for example, would yield a time wheel periodicity of 10 TWI and a TWI of approximately 37.6 μsec (duration of one time slot on the TW given a fixed packet size of 188 bytes). The TWP value calculated in terms of 27 MHz clock ticks is expressed as TWP27M according to equation (4b) as follows:

$$TWP27M = \frac{FPS[bits] \cdot (27E+6)[27\ Mticks/s]}{CBR[bits/s]} \quad (4b)$$

The decimal part of TWPa is expressed, similar to the expression of TWI (equation 2 (a)), in TWPb calculated according to equation (4c):

$$TWPb=TWP27M-(TWP\cdot TWI27M)\ \text{DIV}\ 300 \quad (4c)$$

and TWPe calculated according to equation (4d), $$TWPe=(64(TWP27M-(TWP\cdot TWI27M)))\ \text{DIV}\ 1 \quad (4d)$$

and similar to the MPEG-II PCR syntax expression of TWI. When scheduled, the TWPb is added to the TWPAb and the TWPe is added to the TWPAe representing the accumulated part of a TWE. On reception of the first Transport Packet containing a PID value associated with the newly registered QID, the Packet counter (PC) and the Estimated Time of Arrival (ETA) indicators associated with this QID are reset, and the QID is added to the Scheduler (2) function on position IP governed by equation (5) as follows:

$$IP=(OP+TWP+TWPA)\ \%\ TWS \quad (5)$$

This creates a fixed time to relate all further Packet arrival times.

Upon arrival of subsequent transport packets, the time stamp information of the packet, if present, must be adjusted to is reflect the CBR to which the QID is demultiplexed. It is understood that, opportunistic data inserted into the data transport stream do not have time stamp information. The Scheduler (2) adjusts the time stamp included within the Transport Packet with a Time Stamp Adjustment (TSA) value indicating the difference between ETA and Actual time of Arrival (ATA) as indicated by the time stamp. The TSA value is constructed utilizing two Scheduler (2) components in accordance with equations (6) and (7) as follows:

$$PD = OP_{stored} - OP_{current} \quad (6)$$

$$TSA = (PD \cdot TWI) + (TWPAbe \cdot TWI) \quad (7)$$

where (PD) represents the Packet Delay and is derived from of the number of Time Wheel slots between the ETA indicated by the stored OP value, and the real time of arrival indicated by the current OP value, and expressed in terms of [n]×TWI integral number of time wheel intervals. By definition, $Op_{current}$ is equal to or smaller than $OP_{stored}$ (i.e., a transport stream packet (TSP) may only arrive on time or late). As governed by equation (7), the TSA Time Stamp Adjustmentis built from two parts: a first part (PD•TWI) referring to the Packet "lateness" or difference between the Estimated Time of Arrival (ETA=OPstored) and the Actual Time of Arrival (ATA=OPcurrent); and, the second part (TWPAbe•TWI) which refers to the accuracy tracking mechanism, as for example a 6 Mb/s stream does not have a periodicity of exactly n TW slots when transported in a 40 Mb/sec TDM channel, as described hereinbelow with respect to FIG. 7(b). Since the discrete components cannot work with exact values, TSA is expressed in a Base and Extension (similar to the PCR format) according to equations (8a) and (8b) as follows:

$$TSAb = ((PD + TWPAb) \cdot TWIb) + (((PD + TWPAe) \cdot TWIe) \text{ DIV } 300) \quad (8a)$$

$$TSAe = ((PD + TWPAe) \times TWIe) \text{ \% } 300 \quad (8b)$$

The Time Wheel Periodicity Adjustment value TWPA is governed by logic as set forth according to equation (9) as follows:

$$\begin{aligned} TWPA = \{&1 : (TWPb > TWIb) \cup ((TWPAb = TWIb) \cap \\ &(TWPAe \geq TWIe)) \\ = \{&0 : (TWPAb > TWIb) \cup ((TWPAb = TWIb) \cap \\ &(TWPAe \geq TWIe)) \end{aligned} \quad (9)$$

This scheduler adjustment value indicates the misalignment between the ATA (actual time of arrival) and the Actual Time of Arrival Slot (ATAS) and is derived from the TWPa value. Every arriving packet causes its QID associated Packet Counter (PC) to be incremented, while every demultiplexed packet causes said PC to be decremented. The Scheduler (2) being synchronized with the incoming ChbR, PC values of zero and one are considered normal operational values. Higher values indicate early arriving packets, while negative values indicate discarded or missed IDLE packets. In the instance of a negative PC value, the Scheduler device (2) initiates the IDLE Data Generator (15) using control signals (9), while instructing the DMA Controller (4) to transfer the generated IDLE packet into the Data Queue (12) associated with the negative PC, thus restoring the CBR of the original Data Stream. The associated PC is incremented, thus indicating the under run condition indicated by a negative PC to be handled.

Referring now to FIG. 4, there shown a flow diagram depicting the method 100 of the demultiplex system according to the invention. As shown in FIG. 4, the method comprises four successively performed steps including a first initialization step (102) for initializing QIDs, TW and QOL entries and setting the OP at an arbitrary value between its minimum and maximum range. Then at (104), a synchronization step is performed whereby the TS packet arrives for placement within the input buffer. At the next step (106), the newly arrived TS packet is parsed in the manner as described with respect to the flow diagram illustrated in FIGS. 5(a) and 5(b). Finally, at step (108), the scheduler process is performed in the manner as described with respect to the flow diagram illustrated in FIGS. 6(a) and 6(b). The process then repeats for each newly arrived packet by returning to step (104).

Referring now to FIGS. 5(a) and 5(b), there is illustrated the process implemented by the demultiplex system for handling each newly arrived packet from the transport stream. As indicated at a first step (120), FIG. 5(a), the PID of the packet is accessed to determine the corresponding queue (QID) in packet memory to which it belongs. Then, at step (123), a decision is made as to whether the QID to which that packet belongs is scheduled on a TW slot (FIG. 3(a). If the QID to which the arrived packet belongs is not yet scheduled in the TW, then at step (125), the ETA for the next packet is determined and scheduled in the TW slot. If the QID to which that packet belongs is identified at step (123) or, after the QID is scheduled at step (125), the Packet Counter (PC) associated with the determined QID is incremented by 1 at step (127) indicating the arrival of the new packet for the queue. The process then continues at step (127), FIG. 5(b), where a decision is made as to whether the arrived TS packet contains a Time Stamp indicating its time of arrival (as determined by program clock reference (PCR) which provides 27 MHz clock recovery information). If the arrived TS packet does not contain a Time Stamp, then the process proceeds to step (138) where the TS packet is transferred from the Input Buffer (7) to the Fast Access Buffer (21) as shown in FIG. 2. Otherwise, at step (130), if the arrived TS packet does contain a Time Stamp, the process proceeds to step (132) where the time offset between the estimated and the actual time of arrival as indicated by the time stamp is determined according to equations (6) and (7) described hereinabove. Next, at step (135), the PCR for the packet is re-stamped to indicate the true value which is necessary for recreating the original stream at the intended CBR and the TS packet is transferred from the Input Buffer (7) to the Fast Access Buffer (21) as indicated at step (138).

Figure 6A:
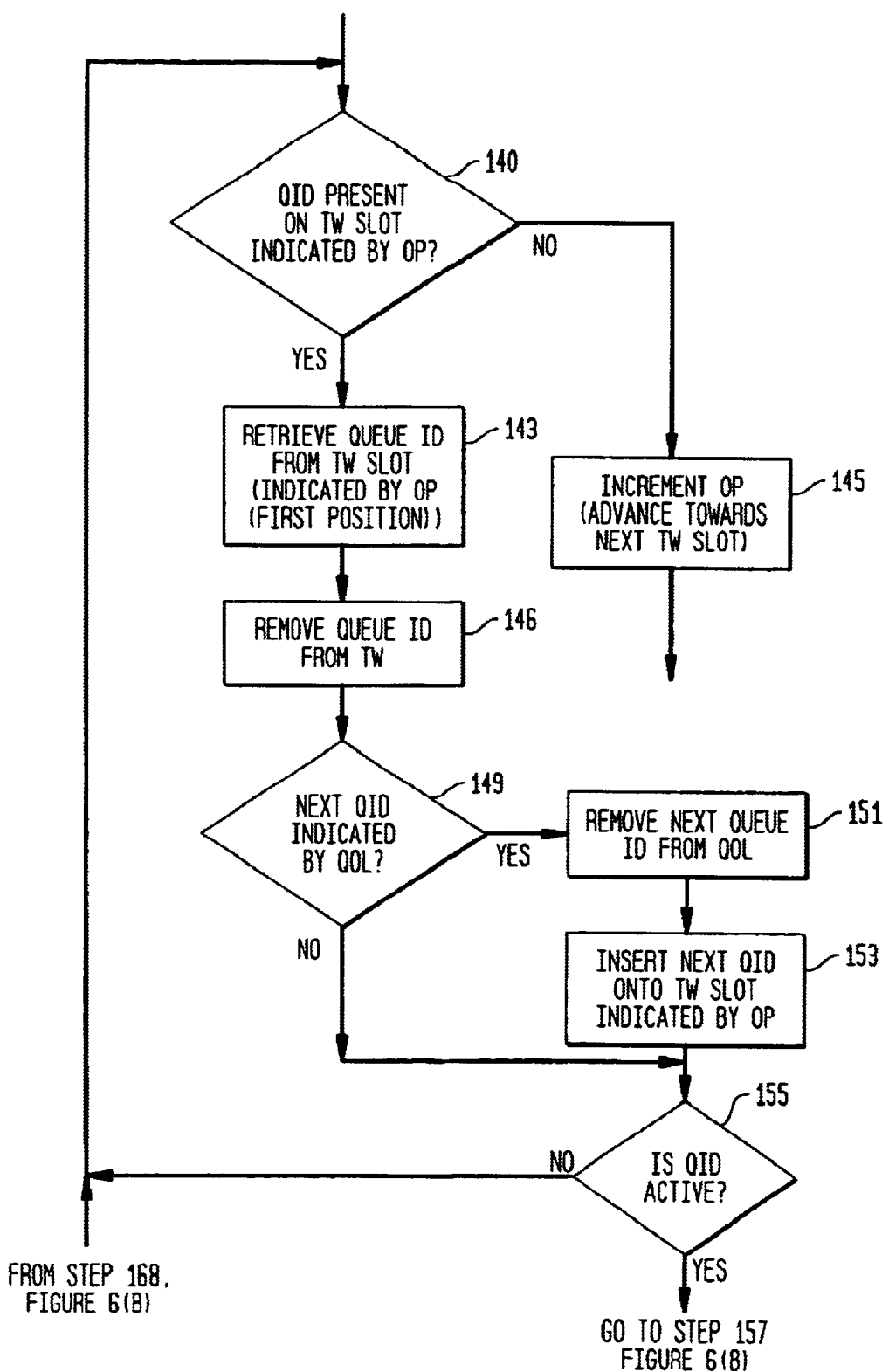

Referring now to FIGS. 6(a) and 6(b) there is illustrated the process implemented by the scheduler (2) for scheduling the arrived packet from the transport stream. As indicated at a first step (140), a determination is made as to whether a QID is present on the TW slot indicated by the OP (FIG. 3(a). If no QID is scheduled at step (140), the OP is incremented to the next TW slot at step (145) and control is returned to the synchronizer for processing the next arrived TS packet. If a QID is scheduled at step (140), the scheduler retrieves the Queue ID from the TW slot indicated by the Output pointer (OP) at step (143) and, at step (146) the QID is removed from the TW. Then, at step (149), a determination is made as to whether a next QID is indicated on the QOL array. If a next QID is indicated, then this QID is removed from the QOL at step (151) and the next QID is inserted onto the TW slot indicated by the OP at step (153). Then, the process proceeds to step (155). If, at step (149), there is no further QID indicated, the process proceeds directly to step (155). At step (155), a check is made to determine whether the scheduled QID is still active. If the QID associated with the arrived packet is no longer active, the process returns to step (140) for processing of the next QID, if present. If the QID is still active, then the process proceeds to the step (157), FIG. 6(b).

Referring now to FIG. 6(b), if the QID retrieved from the TW slot is still active, a periodicity adjustment accumulation for that packet stream is performed at step (157). This adjustment includes a determination of how late the packet is in relation to the real arrival time. This is illustrated by an example depicted in FIG. 7(b) where a transport stream from Source B, a 6 Mbit/sec source, is transmitted on a 40 Mb/sec channel yielding a time wheel entry TWE of 6.666 (equal to one time slot on the TW). The first packet for this stream B is always scheduled at a precise slot 200 with the second packet actually scheduled somewhere in the middle of a slot. However, in compliance with the MPEG standard which does not permit early scheduling, the next packet may be scheduled in the next available whole number slot 201 which is virtually a little bit late e.g., 0.333 $\mu$s. This is repeated for each packet with the lateness accumulating with each received packet. This adjusted lateness of the scheduling time has to be continuously tracked. Thus, the third packet 202 is again scheduled late, but it is the second time, so the accumulated period of adjustment grows to 2 times 0.333 $\mu$s (0.666 $\mu$s). It is noted that for this example, the third packet is not scheduled late at slot 203, however, because its accumulated value becomes 3 times 0.333 $\mu$s which is a whole number slot (equal to 1) and which is subtracted for the accumulated periodicity adjustment. Thus, its scheduling is one before (early). It is understood that this value is utilized in equation 9) for the time wheel adjustments B and E as shown in FIG. 7(b).

In FIG. 6(b) at step (159), a decision is made as to whether the arrival packet counter (PC) associated with that Queue is greater than 0. If the arrival packet counter (PC) associated with that Queue is not greater than 0, then at step (162) an IDLE TS packet is generated by the IDLE Packet Generator (15) (FIG. 2), and, at step (164), the generated IDLE TS packet is written to the fast access buffer (21) for storage in the associated data queue and the process proceeds to step (165). If, at step (159), it is determined that the arrival packet counter (PC) associated with that queue is greater than 0, then at step (160), the arrival packet counter for that queue is decremented by one.

The process then proceeds to step (165), as indicated in FIG. 6(b), where the packet Queue ID is rescheduled on the Time wheel at a position Ip calculated according to equation (5). Then, at step (168), the virtual Estimated Time of Arrival of the next packet for the stream is calculated for the scheduled slot and this value is associated with the Queue for internal storage within the scheduler. The process then returns to step (140), FIG. 6(a)

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for de-multiplexing Constant Bit Rate (CBR) encoded content transmitted over a single channel, said content including fixed size packets associated with one or more sources transmitting streams, at least one stream transmitting packets at an associated CBR, said method including:

a) receiving a stream of packets from a transport stream for placement in a temporary storage buffer;

b) identifying a packet of said stream of packets arriving from a CBR source, said packet having an associated timestamp information indicating actual time of arrival of said packet;

c) determining a time offset indicating a difference between said actual time of arrival of said packet and an estimated time of arrival for said packet according to the CBR associated with the packet stream providing said identified packet; and d) adjusting said timestamp information of said packet with said determined time offset to reflect proper sequence of packet; and e) storing said packet having said adjusted timestamp information in a demultiplex queue associated with that packet stream, whereby said demultiplex queue has an associated demultiplex queue identifier (demultiplex QID) and includes packets having timestamp information enabling subsequent generation of a corresponding transport stream at said CBR.

2. The method as claimed in claim 1, wherein said channel is a time division multiplexed channel having a predetermined channel bit rate, said step of determining a time offset further including a scheduling step including steps of:

maintaining a pointer for tracking real time elapsed in time unit intervals corresponding to said channel bit rate;

maintaining timing information for each said transport stream according to that stream's associated CBR;

determining said estimated time of arrival for a next arrival packet for an associated stream according to that stream's associated CBR; and, storing said estimated time of arrival for an associated demultiplex QID associated with said stream in time unit intervals in said timing information.

3. The method as claimed in claim 2, wherein said timing information maintained indicates a time unit interval having two or more scheduled demultiplex QIDs at a single time unit interval, said scheduling step further including the steps of:

re-scheduling estimated packet arrival times for said demultiplex QIDs having identical estimated packet arrival times according to said timing information maintained;

said timing information further comprising said re-scheduled demultiplex QIDs for one or more streams associated with a time unit interval having said identical estimated packet arrival times.

4. The method as claimed in claim 3, wherein said timing information for transport streams having said re-scheduled estimated packet arrival times comprises a linked list, wherein successive re-scheduled estimated packet arrival times are spaced apart in single time unit intervals in said linked list.

5. The method as claimed in claim 3, wherein said determining said estimated time of arrival for a re-scheduled demultiplex QID includes determining a packet delay in a multiple of time interval units corresponding to a re-scheduled order in said timing information maintained.

6. The method as claimed in claim 5, wherein scheduled demultiplex QIDs are stored in said timing information at whole number time unit intervals, said step of determining an estimated time of arrival further including the step of:

accumulating periodicity adjustment of said timing information for QIDs of transport streams packets characterized as having a CBR that is not an integral multiple of said transport stream channel bit rate.

7. The method as claimed in claim 2, further including maintaining an associated packet counter with each demultiplex queue, said method further including the step of incrementing said Packet Counter (PC) of the associated queue when identifying said associated demultipex queue identifier associated with an arrived packet.

8. The method as claimed in claim 7, wherein said scheduling step further includes the steps of:
retrieving a queue ID from said timing information as real time is elapsed; and
removing a queue ID from said timing information as a packet associated with said transport stream arrives at an expected time unit.

9. The method as claimed in claim 8, wherein said removing step includes the steps of:
comparing a current packet counter value of an associated transport stream with a predetermined threshold indicating a drop in bitrate caused by presence of an Queue originated IDLE packet; and,
generating an IDLE transport packet and storing said IDLE transport packet in said demultiplex queue associated with that identified packet stream when said current packet counter value is less than said predetermined threshold.

10. The method as claimed in claim 9, wherein said removing step includes the steps of decrementing said associated Packet Counter (PC) of said associated queue when said current packet counter value is greater than said predetermined threshold.

11. The method as claimed in claim 2, further including the step of: synchronizing said pointer for tracking real time elapsed in time unit intervals with said channel bit rate.

12. A system for de-multiplexing Constant Bit Rate (CBR) encoded content transmitted over a single communications transport channel, said content including fixed size packets associated with one or more sources transmitting streams at an associated CBR, said system including:
a) means for receiving a packet from said transport stream for placement in a temporary storage buffer;
b) means for parsing a received packet and identifying each packet arriving from a source, said packet having an associated timestamp information indicating actual time of arrival of said packet;
c) scheduler device for determining a time offset indicating a difference between said actual time of arrival of said packet and an estimated time of arrival for said packet according to CBR associated with the packet stream providing said identified packet, said scheduler device adjusting said timestamp information of said packet with said determined time offset to reflect proper sequence of packet; and,
d) demultiplex queue means associated with each program source for storing said arrived packet having said adjusted timestamp information associated with that source, whereby said demultiplex queue means has an associated demultiplex queue identifier (demultiplex QID) and includes packets having timestamp information enabling subsequent generation of a corresponding transport stream at its CBR.

13. The system as claimed in claim 12, wherein said channel is time division multiplexed channel of particular channel bit rate said scheduler device further comprising:
pointer means for tracking real time elapsed in time unit intervals corresponding to said channel bit rate;
first data structure means for maintaining timing information for each said transport stream according to that stream's associated CBR, said scheduler device determining said estimated time of arrival for a next arrival packet for an associated stream according to that stream's associated CBR, and storing said estimated time of arrival for an associated demultiplex QID associated with said stream in said first data structure means in time unit intervals.

14. The system as claimed in claim 13, wherein said timing information maintained indicates a time unit interval having two or more identically scheduled demultiplex QIDs, said scheduler device further including:
means for re-scheduling estimated packet arrival times for said demultiplex QIDs having identical estimated packet arrival times according to said timing information maintained; and
second data structure means associated with said time unit interval of said first data structure means for storing said re-scheduled demultiplex QIDs for one or more streams having said identical estimated packet arrival time.

15. The system as claimed in claim 14, wherein said second data structure means associated with said time unit interval comprises a linked list structure, wherein successive re-scheduled estimated packet arrival times are spaced apart according to single time unit intervals in said linked list structure.

16. The system as claimed in claim 14, further including a packet counter means associated with each demultiplex queue, said scheduler device further incrementing said Packet Counter means (PC) of the associated queue when identifying said demultiplex QID associated with an arrived packet.

17. The system as claimed in claim 16, wherein said scheduler device further retrieves a queue ID from said timing information as real time is elapsed, and removes a queue ID from said timing information as a packet associated with said transport stream arrives at an expected time unit.

18. The system as claimed in claim 17, wherein said scheduler device further includes: comparison means for comparing a current packet counter value of an associated transport stream with a predetermined threshold indicating presence of an IDLE packet; said system further comprising: an IDLE transport packet generator device for generating and storing said IDLE packet in said demultiplex queue associated with that identified packet stream when said current packet counter value is less than said predetermined threshold.

19. The system as claimed in claim 18, wherein said scheduler device further decrements said Packet Counter means (PC) of the associated demultiplex queue ID when said current packet counter value is greater than said predetermined threshold.

20. The system as claimed in claim 14, wherein said scheduler device further includes means for determining a packet delay in a multiple of time interval units corresponding to a re-scheduled order in said timing information maintained.

21. The system as claimed in claim 20, wherein demultiplex QIDs are stored in said first data structure means at whole number time unit intervals, said scheduler device further accumulating periodicity offset of said first timing information maintained for those demultiplex QIDs of transport streams packets stored that have a CBR not an integral multiple of said transport channel bit rate.

22. A program storage device readable by a machine, tangibly embodying a program of instructions executable by the machine to perform method steps for de-multiplexing Constant Bit Rate(CBR) encoded content transmitted over a single communications transport channel, said content including fixed size packets associated with one or more sources transmitting streams at an associated CBR, said method steps comprising:

a) receiving a stream of packets from a said transport stream for placement in a temporary storage buffer;

b) identifying a packet of said stream of packets arriving from a source, said packet having an associated timestamp information indicating actual time of arrival of said packet;

c) determining a time offset indicating a difference between said actual time of arrival of said packet and an estimated time of arrival for said packet according to said CBR associated with the packet stream providing said identified packet; and d) adjusting said timestamp information of said packet with said determined time offset to reflect proper sequence of packet; and, e) storing said packet having said adjusted timestamp information in a demultiplex queue associated with that packet stream, whereby said demultiplex queue has an associated demultiplex queue identifier (demultiplex QID) and includes packets having timestamp information for recreating a corresponding transport stream at said CBR.

23. The program storage device readable by a machine according to claim 22, wherein said channel is characterized as a time division multiplexed channel having predetermined channel bit rate, said step of determining a time offset further including a scheduling step including steps of:

maintaining a pointer for tracking real time elapsed in time unit intervals corresponding to said channel bit rate;

maintaining timing information for each said transport stream according to that stream's associated CBR;

determining said estimated time of arrival for a next arrival packet for an associated stream according to that stream's associated CBR; and, storing said estimated time of arrival for an associated demultiplex QID associated with said stream in time unit intervals in said timing information.

24. The program storage device readable by a machine as claimed in claim 23, wherein said timing information maintained indicates a time unit interval having two or more scheduled demultiplex QIDs at a single time unit interval, said scheduling step further including the steps of:

re-scheduling estimated packet arrival times for said demultiplex QIDs having identical estimated packet arrival times according to said timing information maintained;

said timing information comprising said re-scheduled demultiplex QIDs for one or more streams associated with a time unit interval having said identical estimated packet arrival times.

25. The program storage device readable by a machine as claimed in claim 24, wherein said timing information for transport streams having said re-scheduled estimated packet arrival times comprises a linked list, wherein successive re-scheduled estimated packet arrival times are spaced apart in single time unit intervals in said linked list.

26. The program storage device readable by a machine as claimed in claim 24, wherein said determining said estimated time of arrival for a re-scheduled demultiplex QID includes determining a packet delay in a multiple of time interval units corresponding to a re-scheduled order in said timing information maintained.

27. The program storage device readable by a machine as claimed in claim 26, wherein scheduled demultiplex QIDs are stored in said timing information at whole number time unit intervals, said step of determining an estimated time of arrival further including the step of:

accumulating periodicity adjustment of said first timing information for QIDs of transport streams packets characterized as having a CBR that is not an integral multiple of said transport channel bit rate.

28. The program storage device readable by a machine as claimed in claim 23, further including maintaining an associated packet counter with each demultiplex queue, said method further including the step of incrementing said Packet Counter (PC) of the associated queue when identifying said demultiplex QID associated with an arrived packet.

29. The program storage device readable by a machine as claimed in claim 28, wherein said scheduling step further includes the steps of:

retrieving a queue ID from said timing information as real time is elapsed; and removing a queue ID from said timing information as a packet associated with said transport stream arrives at an expected time unit.

30. The program storage device readable by a machine as claimed in claim 29, wherein said removing step includes the steps of:

comparing a current packet counter value of an associated transport stream with a predetermined threshold indicating presence of an IDLE packet; and, generating an IDLE transport packet and storing said IDLE transport packet in said demultiplex queue associated with that identified packet stream when said current packet counter value is less than said predetermined threshold.

31. The program storage device readable by a machine as claimed in claim 30, wherein said removing step includes the steps of decrementing said associated Packet Counter (PC) of said associated queue when said current packet counter value is greater than said predetermined threshold.

* * * * *